US008038200B2

(12) United States Patent
Plassmeyer et al.

(10) Patent No.: US 8,038,200 B2
(45) Date of Patent: Oct. 18, 2011

(54) CONVERTIBLE VEHICLE

(75) Inventors: Jörg Plassmeyer, Bad Laer (DE);
Heinrich Selle, Bad Oeynhausen (DE);
Ralf Buecker, Hagen (DE); Dirk Flaspöhler, Georgsmarienhutte (DE);
Hermann Heidtmann, Haselunne (DE);
Udo Heselhaus, Ibbenburen (DE)

(73) Assignee: Wilhelm Karmann GmbH, Munich (DE)

( * ) Notice: Subject to any disclaimer, the term of this patent is extended or adjusted under 35 U.S.C. 154(b) by 476 days.

(21) Appl. No.: 11/663,873

(22) PCT Filed: Jul. 29, 2005

(86) PCT No.: PCT/DE2005/001338
§ 371 (c)(1),
(2), (4) Date: Dec. 27, 2007

(87) PCT Pub. No.: WO2006/032227
PCT Pub. Date: Mar. 30, 2006

(65) Prior Publication Data
US 2008/0258511 A1 Oct. 23, 2008

(30) Foreign Application Priority Data
Sep. 25, 2004 (DE) .......................... 10 2004 046 601

(51) Int. Cl.
*B60J 7/08* (2006.01)
*E05C 3/06* (2006.01)
(52) U.S. Cl. ....................................... 296/121; 292/201
(58) Field of Classification Search .................. 296/121, 296/120.1; 292/22, 39, 160, 172, 142, DIG. 5, 292/DIG. 11
See application file for complete search history.

(56) References Cited

U.S. PATENT DOCUMENTS

| 2,831,718 | A | * | 4/1958 | Hallek et al. ..................... 292/48 |
| 3,089,719 | A | * | 5/1963 | Csizmansky .................... 292/25 |
| 3,372,954 | A | | 3/1968 | de Coye de Castelet et al. |
| 4,476,700 | A | * | 10/1984 | King ................................ 70/99 |
| 5,058,939 | A | * | 10/1991 | Miilu ............................ 292/110 |
| 5,269,586 | A | * | 12/1993 | Hahn et al. ..................... 296/224 |
| 5,595,407 | A | * | 1/1997 | ter Horst et al. ................. 292/5 |
| 5,624,149 | A | * | 4/1997 | Tokarz ........................... 296/121 |
| 5,772,275 | A | * | 6/1998 | Tokarz ........................... 296/121 |
| 6,042,174 | A | * | 3/2000 | Durrani .......................... 296/121 |
| 6,419,297 | B2 | * | 7/2002 | Haberl et al. .................. 296/121 |

(Continued)

FOREIGN PATENT DOCUMENTS
DE    3929527 A1    3/1991
(Continued)

*Primary Examiner* — Dennis Pedder
*Assistant Examiner* — Melissa A Black
(74) *Attorney, Agent, or Firm* — Gifford, Krass, Sprinkle, Anderson & Citkowski, P.C.; Douglas L. Wathen

(57) ABSTRACT

A cabriolet includes a displaceable roof that can be secured in its closed position on a windscreen frame. To secure the roof, the cabriolet is equipped with at least two displaceable engagement bodies and at least one associated drive, which interacts with the engagement bodies to transmit the drive force via intermediary elements having a component that extends in the transverse direction of the vehicle. The drive includes a drive member, which is generally parallel to the transverse direction of the vehicle on the plane of the intermediary elements and which is used to displace a gear that controls the displacement of one or more intermediary elements by means of a coupling member that lies on the plane of the drive member.

27 Claims, 16 Drawing Sheets

U.S. PATENT DOCUMENTS

| | | | |
|---|---|---|---|
| 6,672,646 B2 * | 1/2004 | Obendiek | 296/121 |
| 7,226,110 B2 * | 6/2007 | Doncov et al. | 296/121 |
| 7,377,576 B2 * | 5/2008 | Just | 296/121 |
| 7,559,585 B2 * | 7/2009 | Plesternings et al. | 292/201 |
| 7,581,777 B2 * | 9/2009 | Neubrand | 296/121 |
| 2001/0005090 A1 | 6/2001 | Haberl et al. | |
| 2002/0163202 A1 | 11/2002 | Hansen et al. | |
| 2003/0141741 A1 | 7/2003 | Obendiek | |
| 2003/0146643 A1 * | 8/2003 | Dietl | 296/121 |
| 2008/0093881 A1 * | 4/2008 | Selle et al. | 296/121 |

FOREIGN PATENT DOCUMENTS

| | | |
|---|---|---|
| DE | 10139187 A1 | 3/2003 |
| DE | 20023676 U1 | 7/2005 |
| EP | 0972665 A1 | 1/2000 |

* cited by examiner

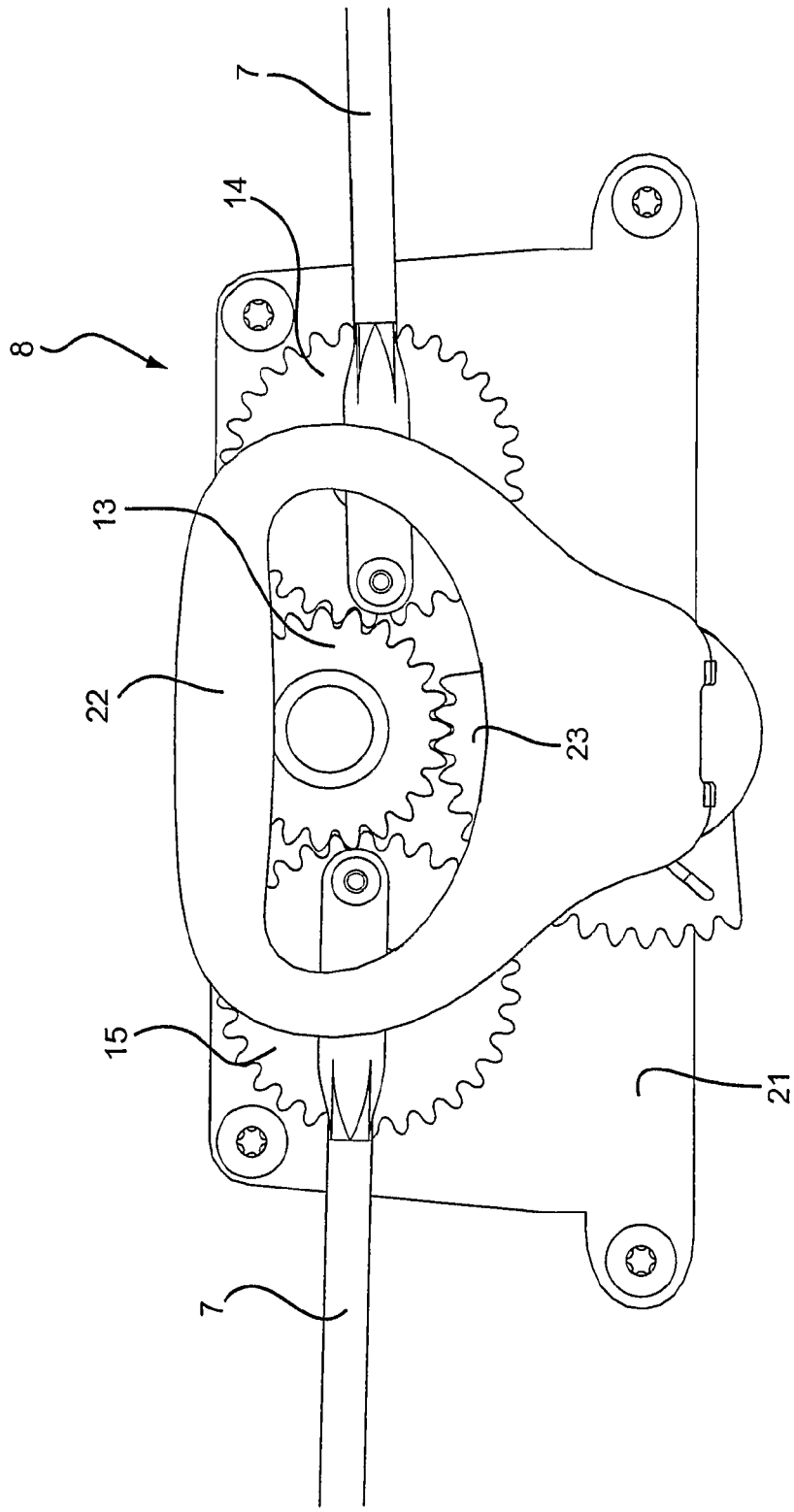

CONVERTIBLE VEHICLE

REFERENCE TO RELATED APPLICATIONS

This application is the United States national phase of Patent Cooperation Treaty application No. PCT/DE05/001338, filed Jul. 29, 2005, which claims priority to German patent application No. DE10 2004 046601.7, filed Sep. 25, 2004, the entire content of both of which are incorporated herein by reference.

FIELD OF THE INVENTION

The invention relates to a convertible vehicle having a roof which can be secured to a windshield frame via engagement bodies of a closing apparatus.

BACKGROUND OF THE INVENTION

A number of convertible vehicles are known in which the movable roof can be secured to the windshield frame of the vehicle in its closed position via two laterally outwardly disposed engagement bodies, for instance rotary latches, arresting hooks or the like.

Both engagement bodies are connected to a central manual or powered drive via force communicators, for instance chains or pull and/or push rods, extended substantially transversely to the vehicle and thus following the shape of the front end of the roof where it contacts the windshield frame.

EP 0 972 665 B1 shows a typical arrangement having a central drive with a vertical rotary axle that acts on a drive wheel rotatable around this axis, with two pull-push rods are connected to opposite sides of the drive wheel. The ends of the pull-push rods are cropped to enable a securing over dead center position and nevertheless to ensure that the push-pull rods of the two sides do not interfere with one another in this position when the roof is closed. When the drive wheel rotates, the cropped portions of the rods migrate far to the front or rear respectively resulting in large space requirements in the longitudinal direction of the vehicle. There are additionally large space requirements in the vertical direction due to the drive arranged on the rotary axle.

Accordingly, it remains desirable to provide a closing mechanism that improves over conventional designs in terms of function and packaging size.

SUMMARY OF THE INVENTION

According to one aspect of the invention, a convertible vehicle is provided with a movable roof that is secured to a windshield frame in a closed position. At least two movable engagement members are provided for securing the roof. At least one drive is provided and is in operative communication with the engagement bodies for the transmission of a drive force via outwardly extending force communicators. The drive force has a component in a generally transverse direction of the vehicle. The drive includes a drive member disposed substantially in the transverse direction of the vehicle and in a general plane of the force communicators. A transmission controls the movement of at least one of the force communicators via a coupling member disposed in the general plane of the drive member.

By this arrangement, the vertical extent of the roof closure is reduced. The drive member can be accommodated in the front end of the roof in a space adjacent to the drive wheel or wheels, without the height of the front end of the roof having to be increased. The drive member does not have to project downwardly beyond the front end of the roof.

According to another aspect of the invention, a convertible vehicle is provided with a movable roof that is secured to a windshield frame in a closed position. At least two movable engagement members are provided for securing the roof. At least one drive is provided and is in operative communication with the engagement bodies for the transmission of the drive force via outwardly extending force communicators. The drive force has a component in a generally transverse direction of the vehicle. A transmission controls the movement of one or more force communicators and includes at least two drive wheels disposed next to one another in the generally transverse direction of the vehicle and in operative communication with one another. The force communicators extend laterally outwardly and are movable by separate drive wheels.

By this arrangement, the extent of the closure is reduced in the longitudinal direction of the vehicle. A cropping of the pull-push rods is not necessary due to the at least two drive wheels being disposed next to one another. It is thus ensured that the space requirements of the closure do not increase in the longitudinal direction of the vehicle on a rotation of the drive wheels.

In particular when the drive wheels have a diameter of less than 50 millimeters, the space requirements are very small in their plane of extent such that a small very light roof front end can be used. In addition, the required driving force for the roof opening movement or for the roof closing movement is thereby minimized.

Irrespective of whether the coupling member acts on a central gear, on one of the drive wheels connected to the force communicators or on two drive wheels, a gear can in any case be provided for a manual emergency actuation if the drive malfunctions. The gear can either be constantly in engagement or, provided it is not needed for the power drive, is only brought into engagement for manual operation, for instance by vertical pressure. The closure thus remains operable even if there is a failure of the drive. The drive member is switched to be either depressurized or free of tension.

It is particularly favorable for the closure to be made in modular form and to include a base plate on which an electrical or a hydraulic drive member can be installed. The same base plate can then used for different vehicle types without changing its dimensions, which increases its flexible application.

BRIEF DESCRIPTION OF THE DRAWINGS

Further advantages and features of the invention result from embodiments of the subject matter of the invention shown schematically in the drawing and described in the following descriptions.

FIG. 9a shows a similar view to FIG. 9 with a similar transmission arrangement, but with a manual actuating lever and a gear segment as a coupling member of the transmission;

DETAILED DESCRIPTION OF THE INVENTION

Figure 1:
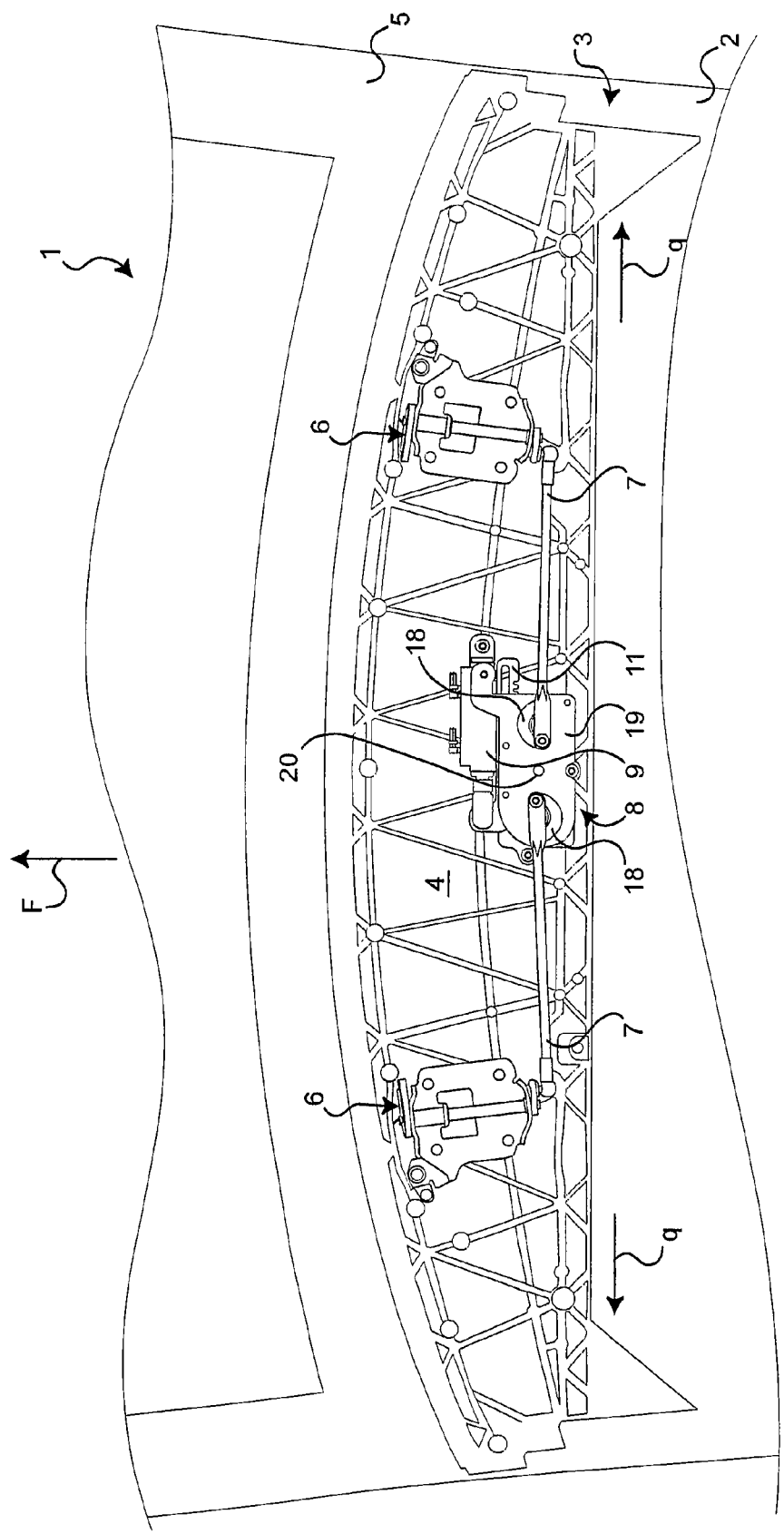
FIG. 1 is a bottom view of a front roof end or roof peak and a schematically indicated windshield frame with a central closure module and laterally outwardly disposed engagement bodies for latching (not shown here) to the windshield frame.
Figure 2:
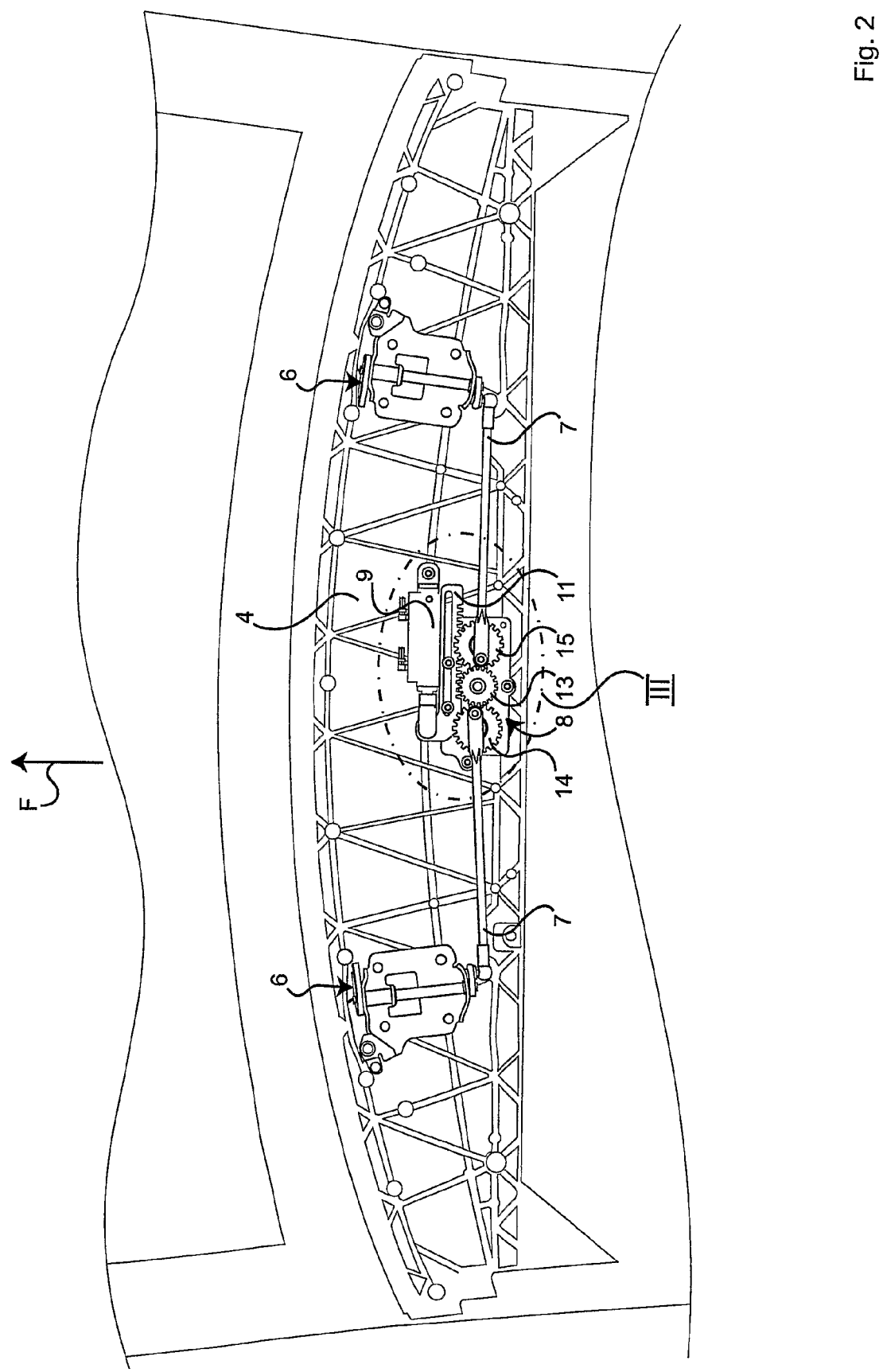
FIG. 2 shows a similar view to FIG. 1, but without a windshield frame or roof cover after removal of the cover plate of the closure module.

Referring to the figures, a convertible vehicle according to the invention is indicated at 1. The vehicle 1 includes a movable roof 3, which can be actuated between a closed or extended position extending over a passenger compartment and an open or retracted position disposed in a stowage space disposed adjacent to the passenger compartment. In the illustrated embodiment, the movable roof 3 includes a flexible roof cover 2.

The roof 3 includes a front end or roof peak 4 located toward a front of the roof 3 in a direction of travel, indicated at F. Described in greater detail below, the front end of the roof 4 is latchable to a windshield frame 5 of the vehicle 1 to secure the roof 3 in the closed position.

In the illustrated embodiments, the vehicle 1 includes a pair of engagement bodies 6 for releasably latching the front end of the roof 4 to the windshield frame 5. The engagement bodies are disposed outwardly and laterally in a generally transverse direction q in the vehicle. The engagement bodies 6 are generally hook shaped and are pivotable around horizontal axes. The number of engagement bodies is also variable. A central engagement member may, for example, be provided.

The engagement bodies 6 are movable via force communicators 7 that extend outwardly from a central closure module 8. The force communicators are configured as pull-push rods in the illustrated embodiments. Chains, cable controls, toothed belts or similar can also be considered.

Figure 8:
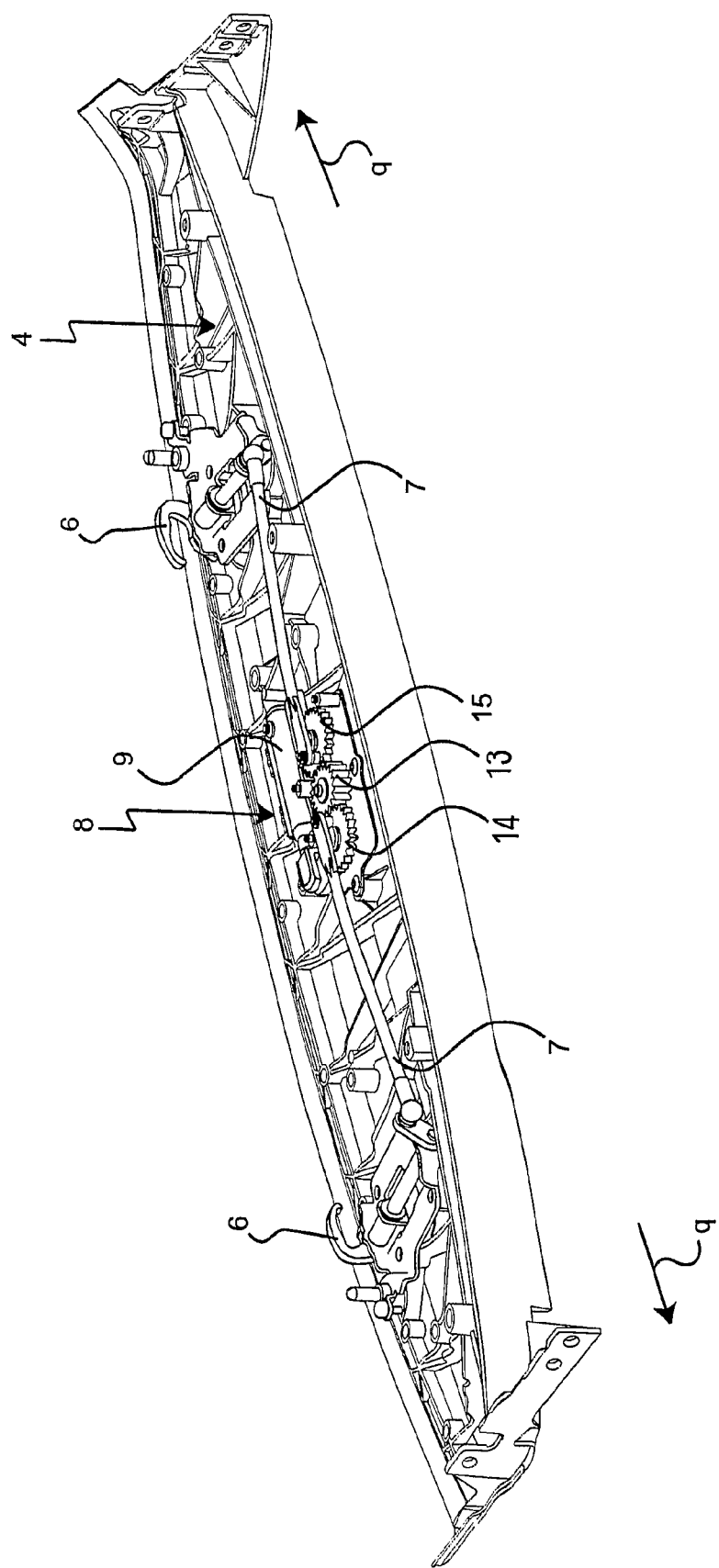
FIG. 8 shows the front end of the roof of FIG. 2 in a perspective view obliquely from below.

The closure module 8 includes a drive, which may lie off center. The drive is provided in one embodiment in the form of a hydraulic drive member 9 or an electrical drive member 10. The drive member is disposed generally parallel to the transverse direction q of the vehicle and in the general plane of the force communicators 7, thus substantially horizontally. As shown, for example, in FIG. 8, the drive member 9, 10 can be fully received inside the vertical extent of the front end of the roof 4 without projecting downwardly beyond it. Since only a relatively small exertion of power is required, the drive member 9, 10 can be made so flat that the vertical extent of the front end of the roof does not have to be enlarged to receive it.

It can even be possible due to the small packaging size of the closure module 8 to arrange it with the engagement bodies 6 and the force communicators 7 in the windshield frame 5.

In the first embodiment (FIG. 1 to FIG. 8), the hydraulic cylinder 9 is shown as the drive member, with a piston that moves substantially horizontally and transversely to the vehicle. A coupling member 11, in the form of a toothed rack, is movable linearly with the piston of the drive member 9. The coupling member 11 drives a transmission for moving the force communicators.

Figure 9:
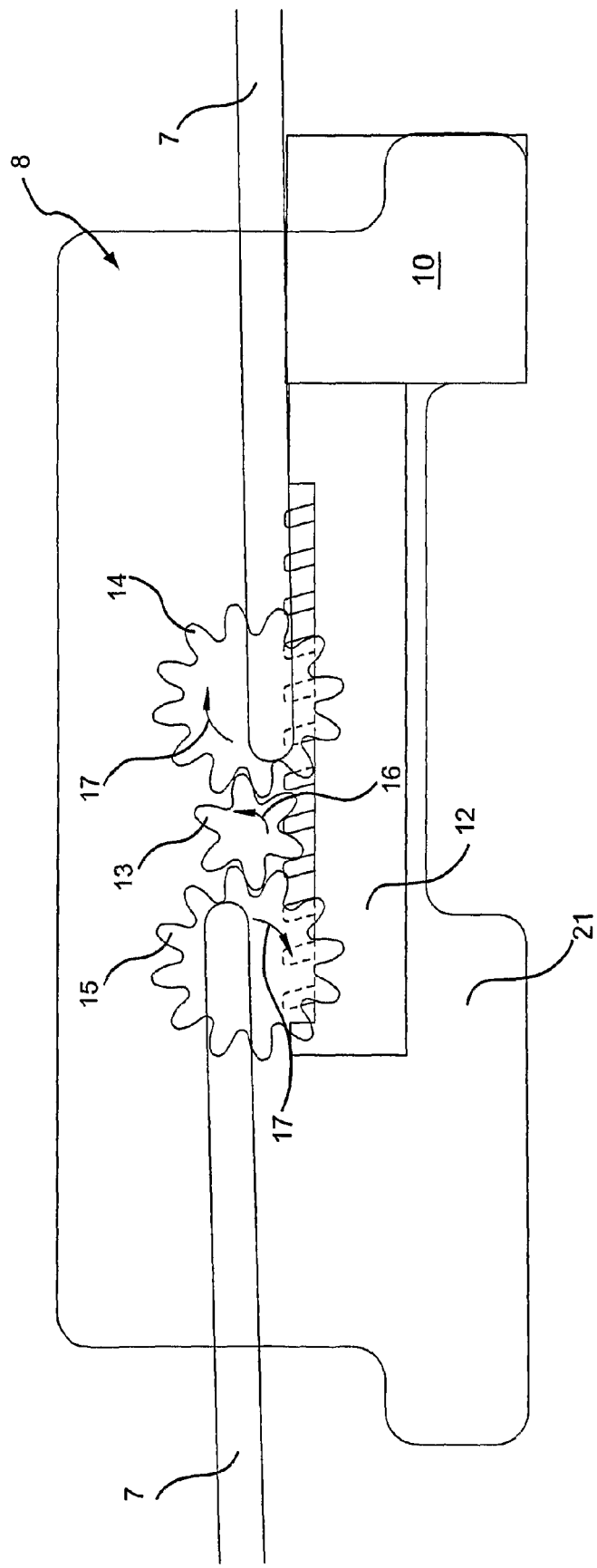
FIG. 9 shows a similar view to FIG. 3 with a similar transmission arrangement, but with an electrical drive member and a spindle as the coupling member of the transmission.

In another embodiment shown in FIG. 9, using the same transmission structure, the electric motor 10 is provided as the drive member. The electric motor has a drive axle that is disposed horizontally and transversely to the vehicle. A spindle 12, a spiral cable, a worm shaft or the like is provided as the coupling member on the drive axle and translates the rotary movement of the drive axle into a translation approximately into the transverse direction q of the vehicle. A cable control, a chain or a toothed belt are also possible as coupling members, for example.

Figure 5:
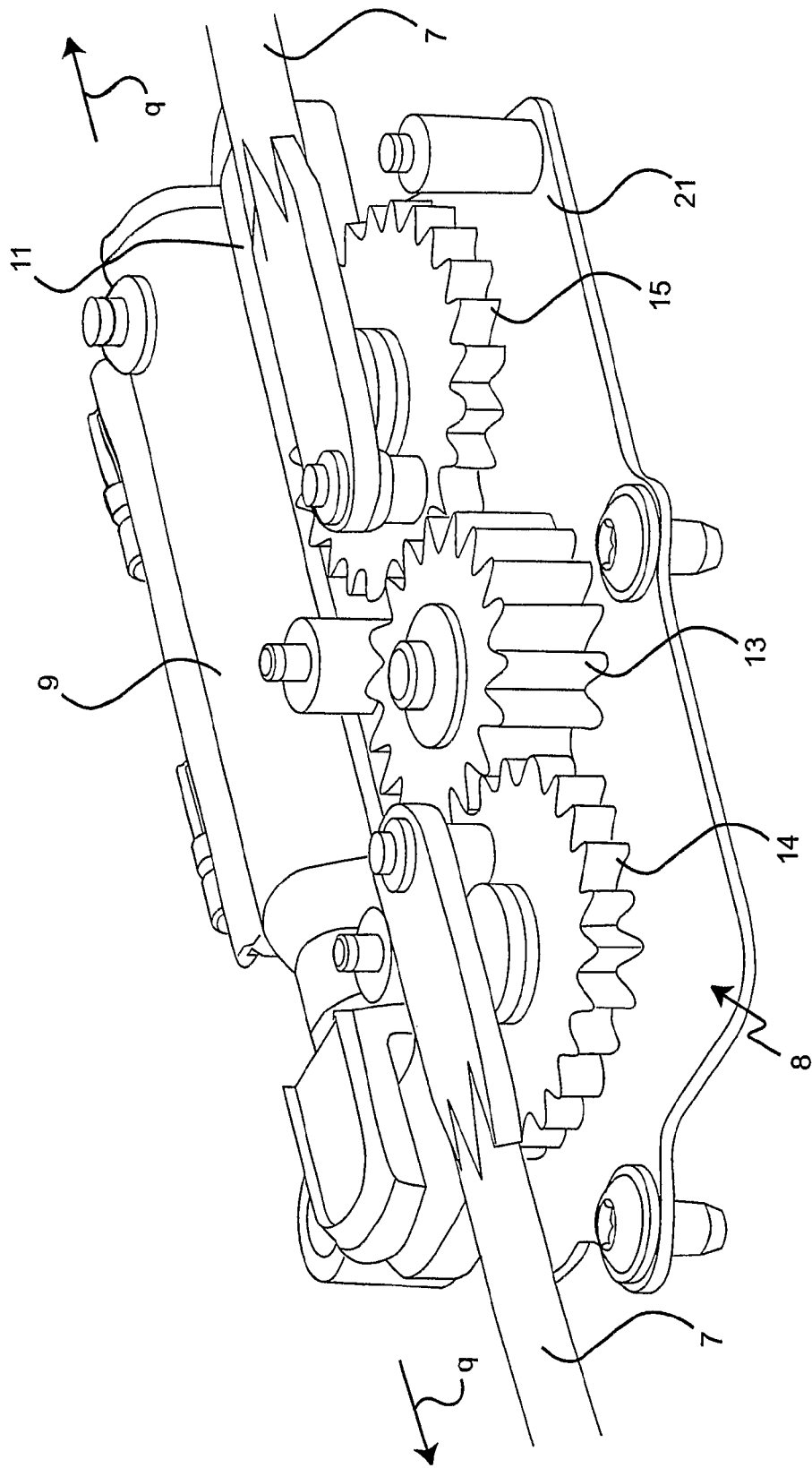
FIG. 5 shows the parts of FIG. 3 in a perspective view.
Figure 6:
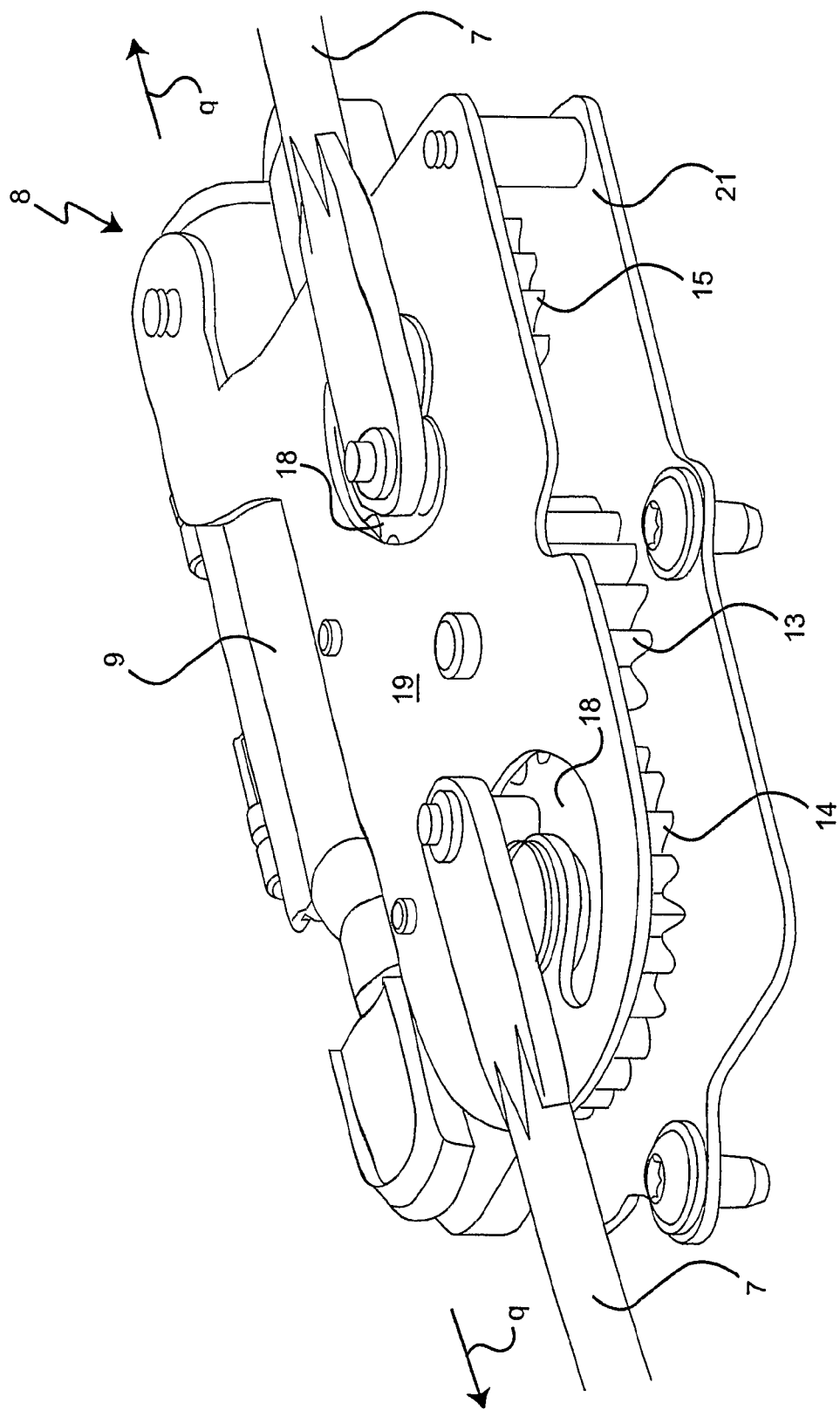
FIG. 6 shows the parts of FIG. 4 in a perspective view.
Figure 7:
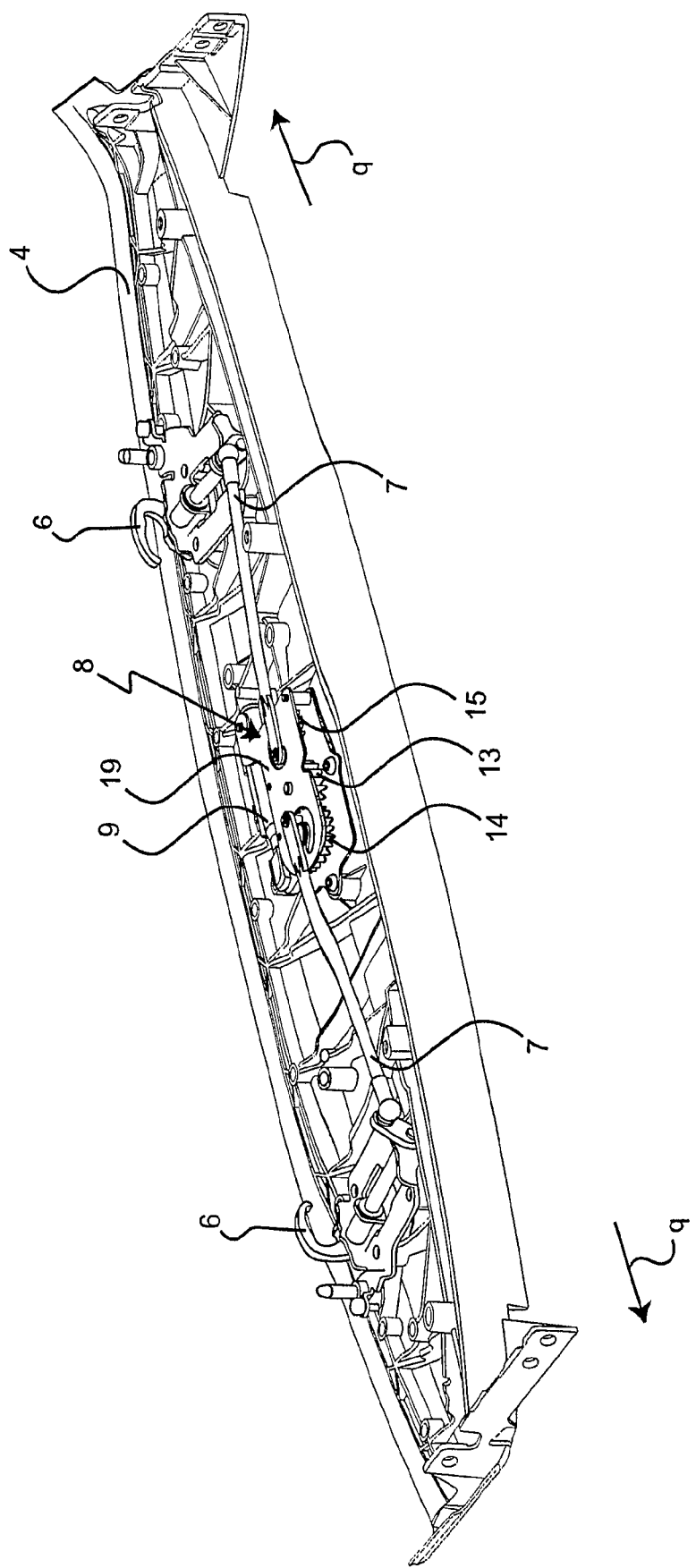
FIG. 7 shows the front end of the roof of FIG. 1 in a perspective view obliquely from below.

In both types of drive, the coupling member 11, 12 engages a central gear 13 (see e.g. FIG. 5) which engages two drive wheels 14, 15 which are larger and are disposed to the side thereof in the transverse direction q of the vehicle. They therefore rotate in opposite directions. The central gear 13 has a larger vertical extent than the drive wheels 14, 15. The gear 13 can thus be in engagement with the respective coupling member 11, 12 without the larger drive wheels 14, 15 interfering therewith. They can extend partly in a plane above or below the coupling member 11, 12 (FIG. 5, FIG. 9).

Figure 3:
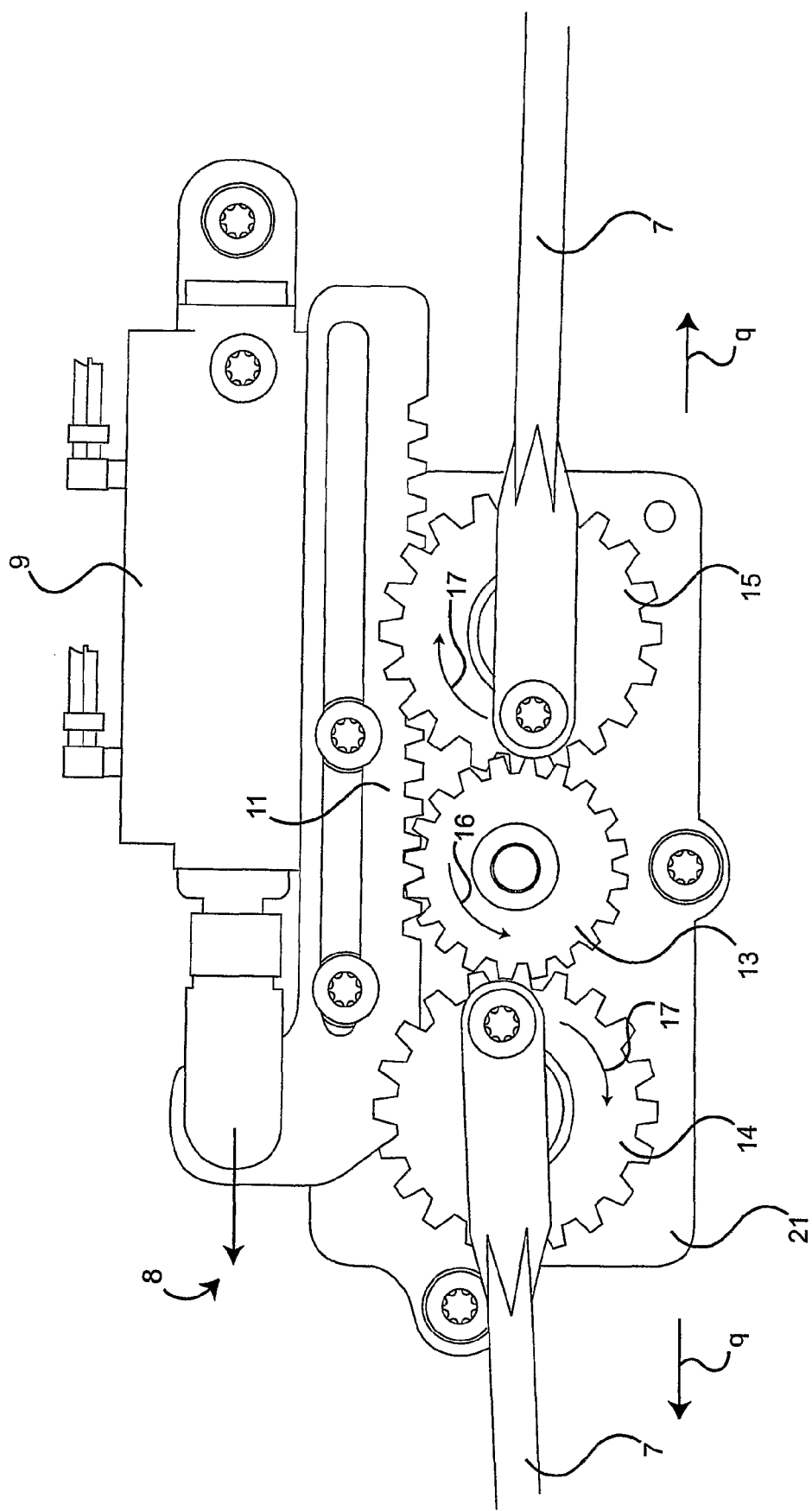
FIG. 3 shows a detailed view of the closure module, approximately corresponding to the detail III in FIG. 2.
Figure 4:
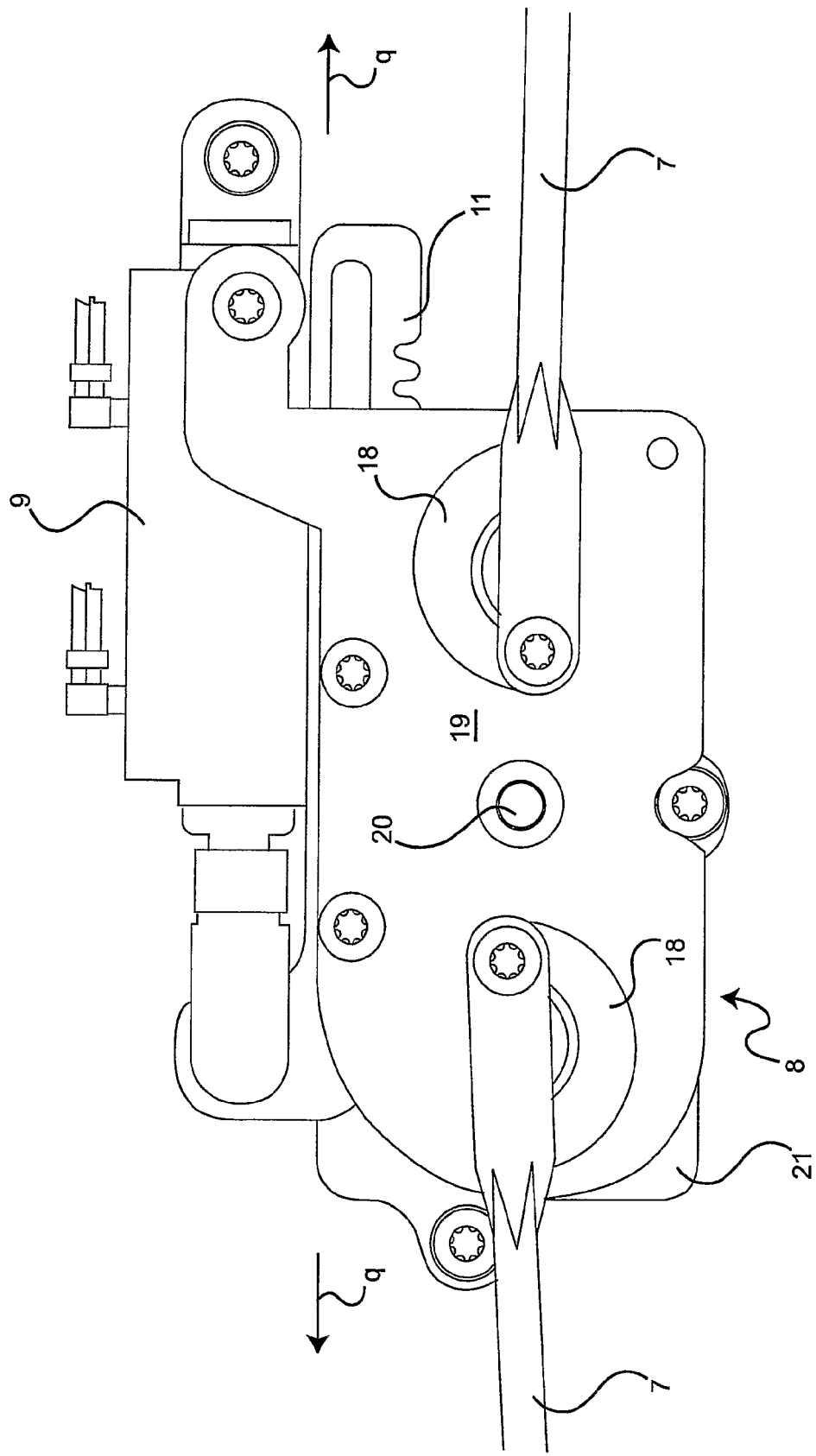
FIG. 4 shows a similar view to FIG. 3, but with a cover plate.

The drive wheels 14, 15 support the ends of the force communicators 7. In FIG. 5, the closed position is shown in which the ends face the longitudinal center of the vehicle. In this context, they are self-securing in an over dead center position (FIG. 3). They have exceeded the maximum inwardly acting pulling force by a low angle of rotation of the drive wheels 14, 15.

The central gear 13 is set into rotation in the direction of the arrow 16 by the respective coupling member 11, 12 by the outward thrust of the piston of the hydraulic cylinder 9 or by rotation of the electric motor 10 and thereby rotates the drive wheels 14, 15 in the directions of the arrows 17. The force communicators 7 are hinged to the drive wheels such that they can be moved upwardly beyond their dead center positions in circular segment tracks 18 of a cover plate 19 bounding the closure module 8 and can open the engagement bodies 6.

To enable an emergency actuation even with a failure of the respective drive member 9, 10, the gear 13 can be rotated manually. For this purpose, a cut-out 20 is provided in the cover plate 19 for the engagement of a tool. With a hydraulic drive 9, it can be depressurized so that the gear 13 can also remain in engagement with the coupling member 11 during its manual rotation. When an electric motor 10 is used (FIG. 9), it can be necessary to press the gear 13 out of the engagement plane with the coupling member 11, for instance vertically upwardly against the force of a spring, for a manual actuation. Due to the thickness of the gear 13, it remains in engagement with the drive wheels 14, 15 in this process and can thus rotate them.

As shown in FIG. 9a, a manual actuation lever 22 can also be provided instead of the hydraulic or electrical drive member 9, 10. The manual actuation lever 22 engages the gear 13 using a gear segment 23. The gear 13 is installed in the same way as above on the base plate 21. The arrangement of the gears 14, 15 also remains the same as above. The manual actuation assembly can also be installed alternatively in each case on the same base plate 21 in the following embodiments.

Figure 10:
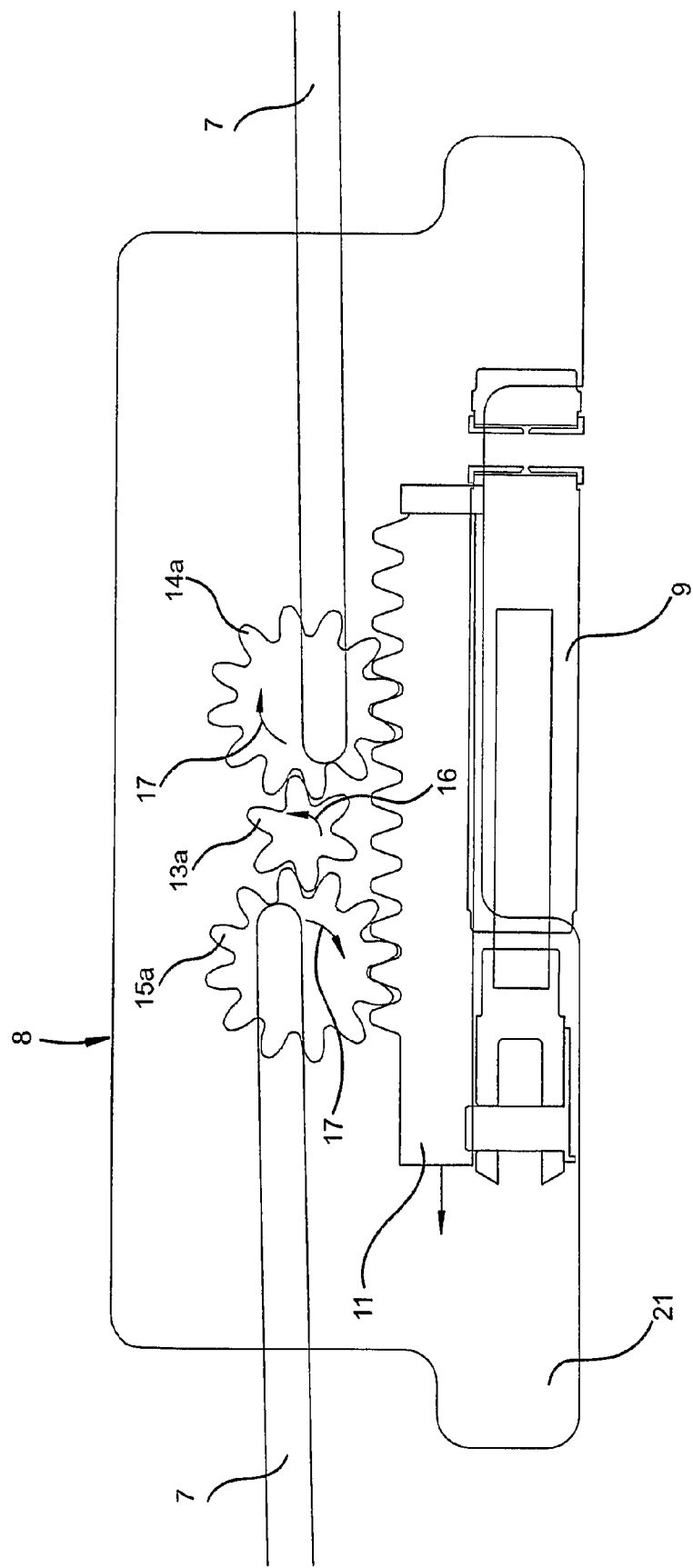
FIG. 10 shows an alternative embodiment with two drive wheels driven via the coupling member and a hydraulic drive.
Figure 11:
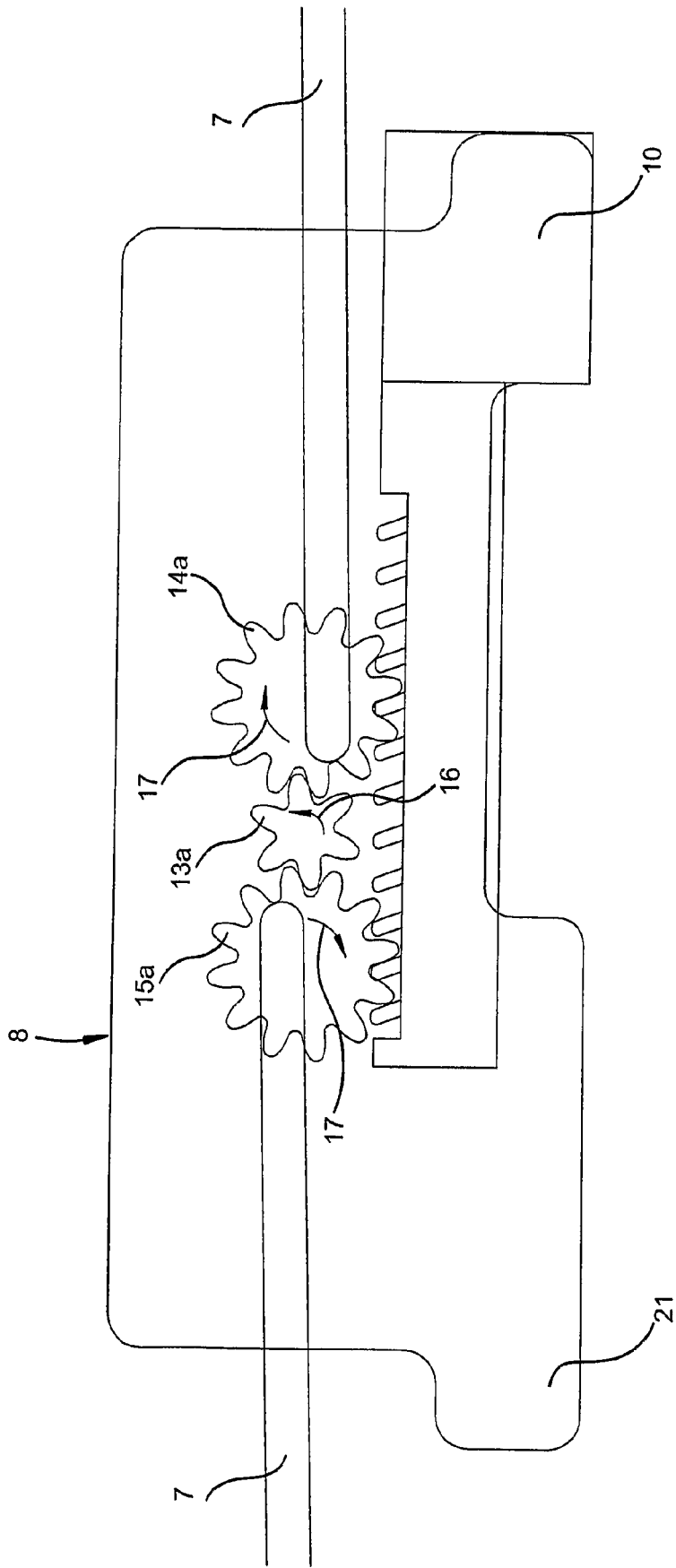
FIG. 11 shows a similar view to FIG. 10 with a similar transmission arrangement, but with an electrical drive member and a spindle as the coupling member of the transmission.

In FIG. 10, a further embodiment is shown with a hydraulic cylinder 9 and in FIG. 11 with an electric motor 10 with the same transmission configuration.

A base plate 21 of the closure module 8 is configured here, as in the other embodiments, such that one or the other type of drive can be installed so that the module 8 can be used without further modifications both in vehicles with electrical and with hydraulic closure actuation, which substantially extends the application possibilities and enables a mass production of the module 8. Alternatively, a further coupling member, for instance a gear segment, for an installable manual actuation lever can also be provided so that the module 8 can also be used for a cost-effective manual actuation.

In the embodiment in accordance with the FIGS. 10 and 11, the coupling member 11, 12 simultaneously engages two drive gears 14a, 15a which are disposed next to one another, are spaced apart from one another and to which respective force communicators 7 are pivoted. Both gears 14a, 15a therefore rotate in the same direction.

A gear 13a may be disposed between the gears 14a, 15a and not in engagement with the coupling member 11, 12. The gear 13a is only required for manual emergency operation and does not have to be in engagement position with the drive wheels 14a, 15a during normal operation. Alternatively, here as in the other embodiments with an electrical drive member 10, the emergency actuation can also take place with a reduced expenditure of force without this gear 13a via a direct influencing of the drive shaft.

Figure 12:
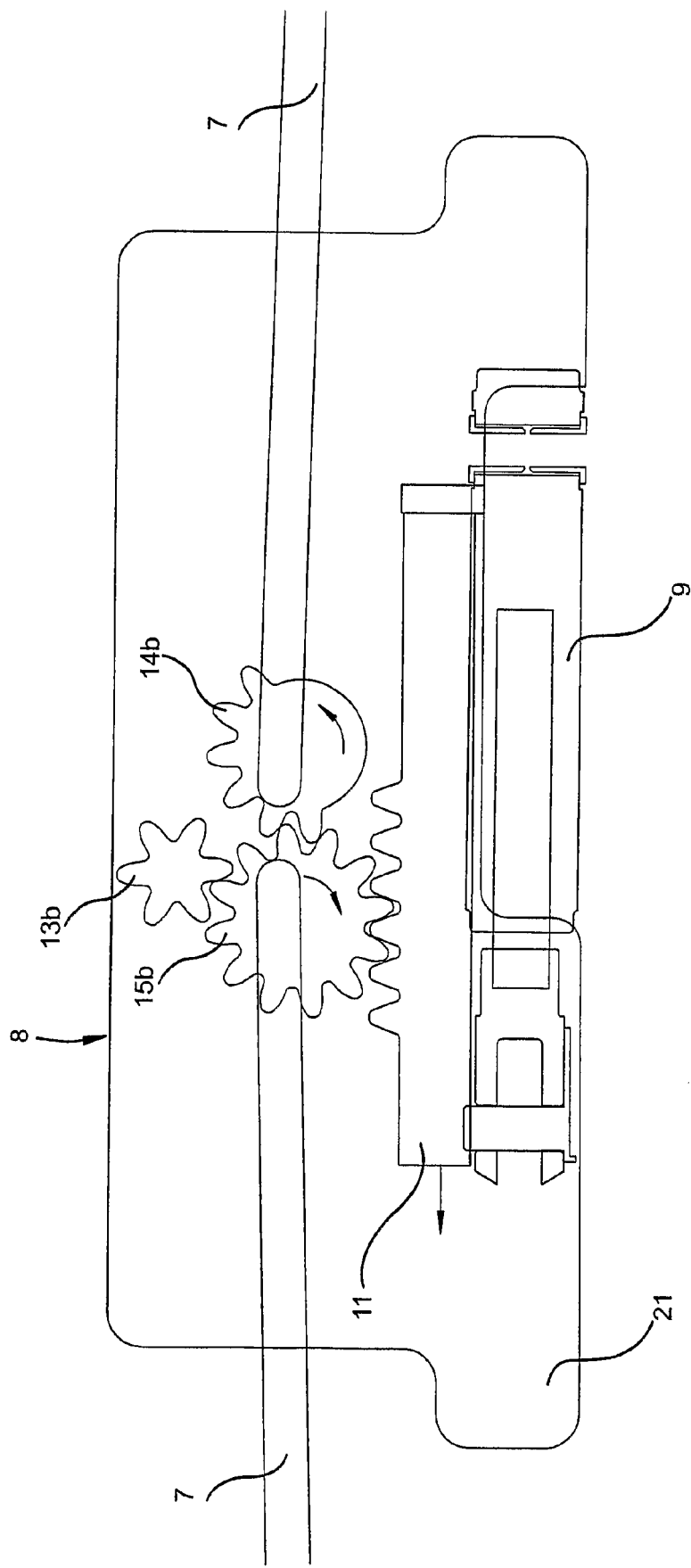
FIG. 12 shows a further alternative embodiment with exactly one drive wheel driven via the coupling member and a hydraulic drive.
Figure 13:
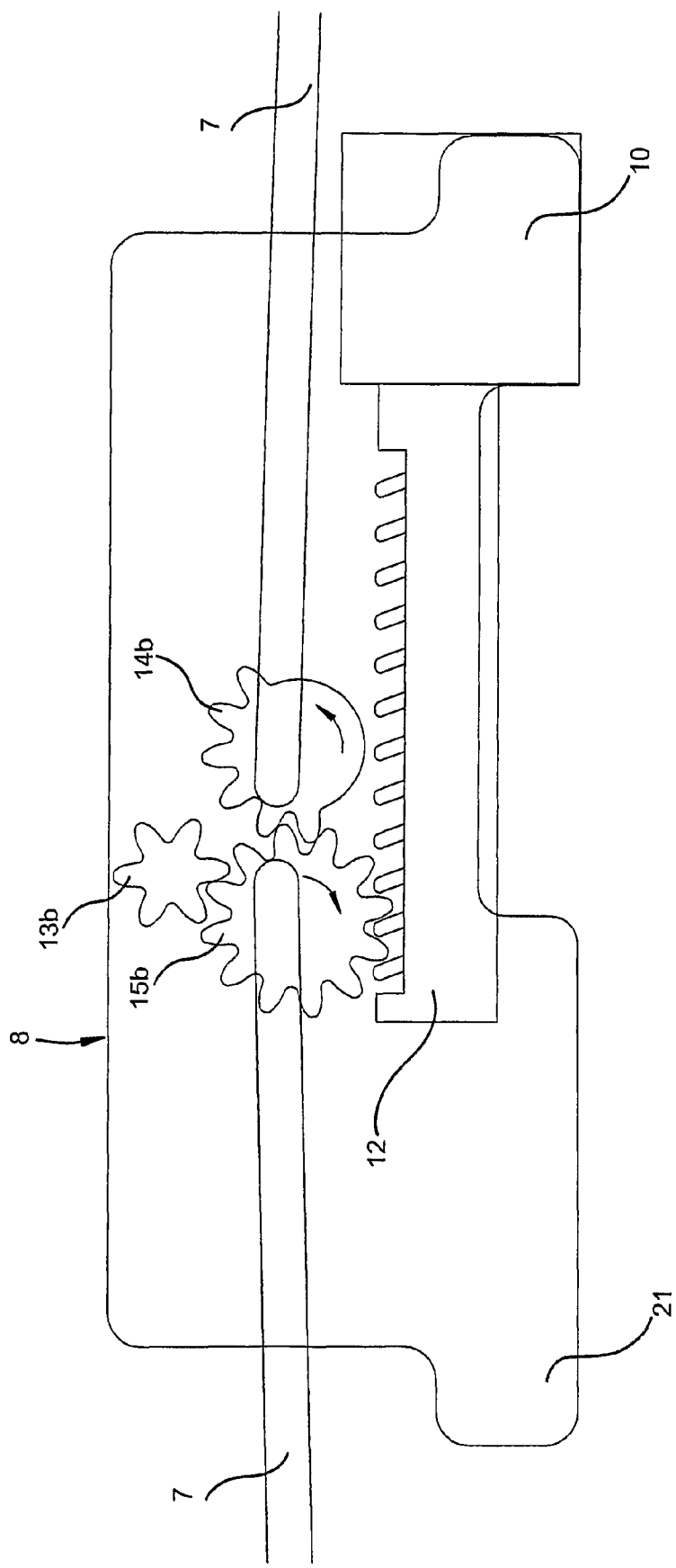
FIG. 13 shows a similar view to FIG. 12 with a similar transmission arrangement, but with an electrical drive member and a spindle as the coupling member of the transmission.

In a further embodiment (FIG. 12, FIG. 13), the coupling member only engages a first drive gear 15b to which a force communicator 7 is pivoted. A second drive wheel 14b for a second force communicator 7 can be driven by this drive gear—here directly and therefore rotating in the opposite direction. The second drive wheel 14b is only provided with teeth over a part of its circumference so that it has a reduced diameter at the remaining part circumference and the coupling member 11, 12 can thereby be pushed past it without colliding with the drive wheel 14b.

An additional gear 13b, which can engage one of the drive wheels 15b, 14b, can be provided for the manual emergency operation and likewise does not have to be in an engagement position during normal operation. Here, too, alternatively, emergency operation is possible via an influencing of the drive shaft with force deflection for a manual rotation around a vertical axis of rotation.

In the previously shown embodiments, the transmission in each case includes at least two drive wheels 14, 15; 14a, 15a; 14b, 15b disposed next to one another in the transverse direction of the vehicle and in operative communication with one another. The laterally outwardly engaging force communicators 7 are in each case movable by separate drive wheels 14, 14a, 14b or 15, 15a, 15b. There is thereby no risk of collision even in a closed roof position with an over dead center position of the ends of the force communicators 7 even on their straight-line configuration. No cropping is required. It is thereby ensured that no part of the force communicator 7 projects beyond the diameter of the respective drive wheel 14, 15; 14a, 15a; 14b, 15b in the longitudinal direction of the vehicle during any phase of the closing movement. The extent of the closure module is therefore not only very small in height, but also in the longitudinal direction of the vehicle. The diameter of a drive wheel 14, 15; 14a, 15a; 14b, 15b is typically 40 to 50 millimeters. There is in contrast sufficient space available in the front end of the roof 4 in the transverse direction q of the vehicle, whereby arranging a plurality of gears next to one another is not a problem.

Figure 14:
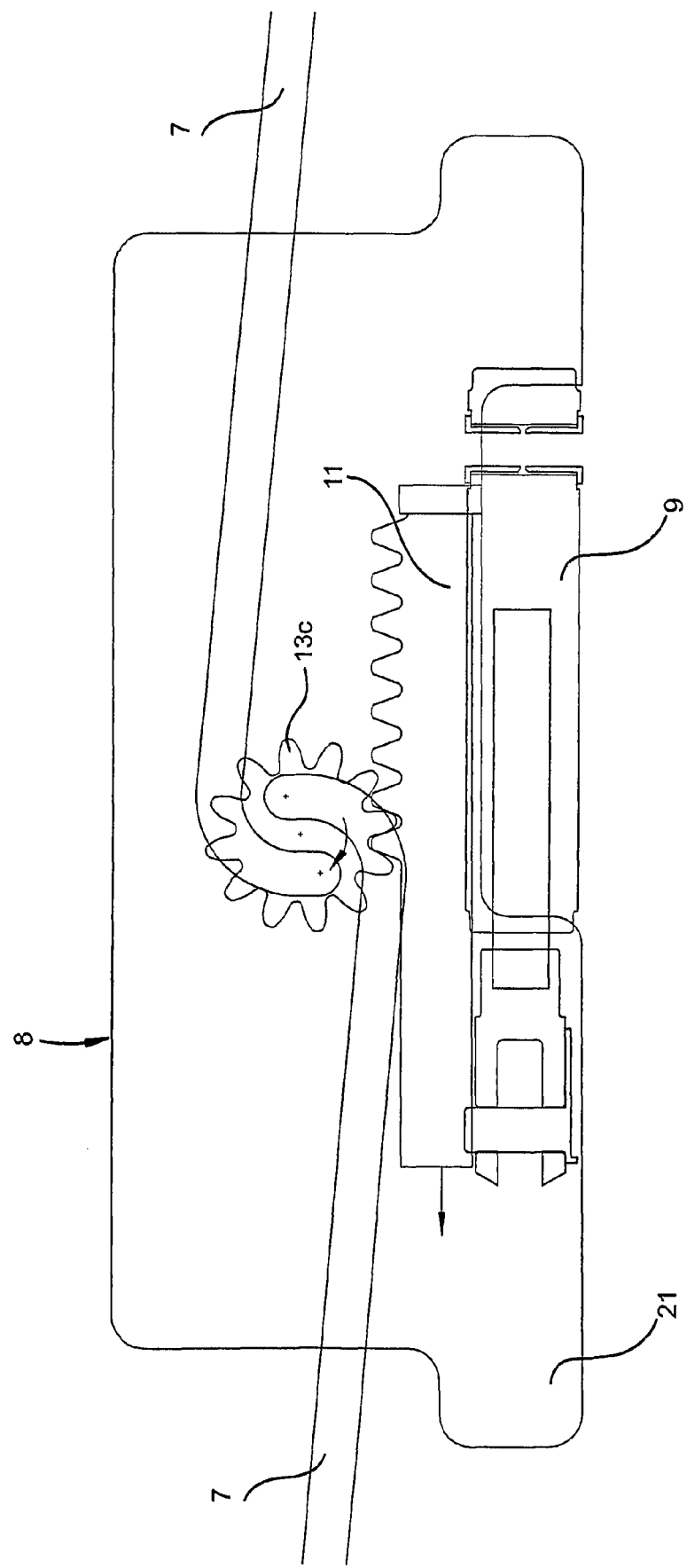
FIG. 14 shows a further alternative embodiment with exactly one drive wheel driven via the coupling member and a hydraulic drive.
Figure 15:
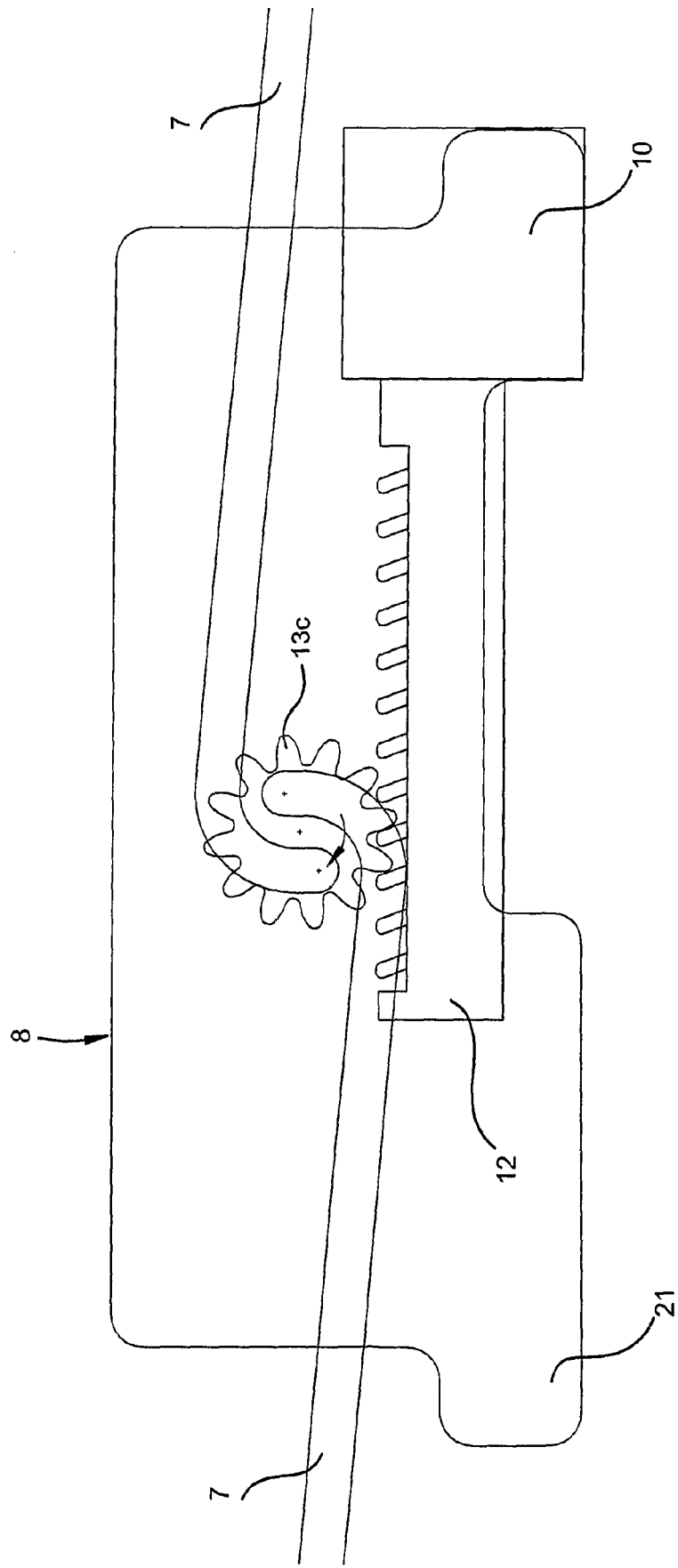
FIG. 15 shows a similar view to FIG. 14 with a similar transmission arrangement, but with an electrical drive member and a spindle as the coupling member of the transmission.

A further embodiment (FIG. 14, FIG. 15) shows that it is also possible to provide the drive arrangement in accordance with the earlier embodiments without the side by side drive wheels. The vertical extent of the closure module 8 is also reduced here. Both pull-push rods 7 are here held, however, at a common gear 13c which is directly drivable via the respective coupling member 11 with a hydraulic drive 9 (FIG. 14) or 12 with an electrical drive 10 (FIG. 15). The force communicators 7 are therefore cropped in a conventional manner to avoid the risk of collision.

The closure module 8 can be pre-assembled and tested in every case before its installation and can be mounted on the front end of the roof 4 as a modular unit.

The vehicle as shown in the illustrated embodiment and described herein is a soft top. It should, however, be readily appreciated by those having ordinary skill in the art that the top may also be a hard top having rigid panels instead of a flexible cover, or a hybrid top having a combination of rigid panels and a flexible cover. Further, the vehicle as described herein may be a two seater or have a larger interior space with two seating rows behind one another.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A convertible vehicle, comprising:
    a windshield frame;
    a movable roof with a front end, the roof having a closed position wherein the front end is secured to the windshield frame;
    at least two movable engagement bodies disposed in the front end of the roof and operable to secure the front end of the movable roof to the windshield frame in the closed position;
    a pair of force communicators each having an inner end and an outer end, the outer end of one of the force communicators operatively connected to each of the engagement members;
    a drive disposed in the front end of the roof, the drive having a drive member disposed substantially transversely with respect to the vehicle, the drive member and the force communicators being disposed generally in a first shared plane;
    a coupling member directly coupled to the drive member and disposed substantially transversely, the coupling member including a toothed rack disposed generally parallel to the drive member, the toothed rack having a plurality of teeth extending therefrom; and
    a transmission operatively engaging the coupling member and the inner ends of the force communicators, the transmission including at least one gear directly engaged with the teeth of the coupling member, the gear having an axis of rotation that is generally vertical when the roof is in the closed position.

2. A convertible vehicle in accordance with claim 1, wherein:
    the drive member is a hydraulic drive member having a piston movable along an axis that is generally horizontal and transverse to the vehicle.

3. A convertible vehicle in accordance with claim 1, wherein:
    the at least one gear in the transmission is a central first gear, the transmission further including two drive gears disposed laterally next to the central first gear, the force communicators being coupled to the drive gears.

4. A convertible vehicle in accordance with claim 3, wherein:
wherein the central first gear is movable out of an engagement position with the coupling member while remaining in engagement with the drive gears and can be actuated manually in an emergency.

5. A convertible vehicle in accordance with claim 1, wherein:
the transmission includes two drive gears disposed next to one another and spaced apart from one another;
the coupling member engages each of the drive gears;
and one of the force communicators in pivoted to each of the drive gears.

6. A convertible vehicle in accordance with claim 5, wherein:
the transmission includes a further gear for a manual emergency actuation, the further gear engaging the drive gears at least during said manual actuation.

7. A convertible vehicle in accordance with claim 1, wherein:
the at least one gear in the transmission is a first drive gear, an inner end of one of the force communicators being pivoted to the first drive gear, the transmission further including a second drive gear driven by the first drive gear, an inner end of the other force communicator being pivoted to the second drive gear.

8. A convertible vehicle in accordance with claim 7, wherein:
the transmission includes a further gear for a manual emergency actuation, the further gear engaging one of the drive gears at least during said manual actuation.

9. A convertible vehicle in accordance with claim 1, wherein the force communicators are pull-push bars.

10. A convertible vehicle in accordance with claim 3, wherein the drive gears have a diameter of less than 50 millimeters.

11. A convertible vehicle, comprising:
a windshield frame;
a movable roof with a front end, the roof having a closed position wherein the front end is secured to the windshield frame;
at least two movable engagement bodies and operable to secure the front end of the movable roof to the windshield frame in the closed position;
a pair of force communicators each having an inner end and an outer end, the outer end of one of the force communicators operatively connected to each of the engagement members;
a drive having a drive member disposed substantially transversely with respect to the vehicle, the drive member and the force communicators being disposed generally in a first shared plane;
a coupling member; and
a transmission operatively engaging the coupling member and the inner ends of the force communicators, the transmission including at least two rotary drive gears disposed next to one another in a generally transverse direction of the vehicle and in operative communication with one another, the inner end of one of the force communicators being interconnected with one of the rotary drive gears and the inner end of the other force communicator being interconnected with a second one of the rotary drive gears, each of the rotary drive gears having an axis of rotation that is generally vertical when the roof is in the closed position.

12. A convertible vehicle in accordance with claim 11, wherein:
the drive and the engagement bodies are disposed in the front end of the roof.

13. A convertible vehicle in accordance with claim 11, wherein
the coupling member is directly coupled to the drive member.

14. A convertible vehicle in accordance with claim 11, wherein:
the drive member is an electrical drive member having an axis of rotation that is generally horizontal and transverse to the vehicle; and
the coupling member is a spindle directly connected to the electrical drive member.

15. A convertible vehicle in accordance with claim 11, wherein:
the drive member is a hydraulic drive member having a piston movable along an axis that is generally horizontal and transverse to the vehicle; and
the coupling member is a toothed rack directly coupled to the piston.

16. A convertible vehicle in accordance with claim 11, wherein:
the transmission includes a central first gear engaged with the coupling member and with the drive gears.

17. A convertible vehicle in accordance with claim 16, wherein the central first gear is movable out of an engagement position with the coupling member while remaining in engagement with the drive gears and can be actuated manually in an emergency.

18. A convertible vehicle in accordance with claim 11, wherein:
the coupling member engages each of the drive gears.

19. A convertible vehicle in accordance with claim 18, wherein:
the transmission includes a further gear for a manual emergency actuation, the further gear engaging the drive gears at least during said manual actuation.

20. A convertible vehicle in accordance with claim 11, wherein:
the one of the drive gears engages the coupling member and drives the second one of the drive gears.

21. A convertible vehicle in accordance with claim 20, wherein:
the transmission includes a further gear for a manual emergency actuation, the further gear engaging one of the drive gears at least during said manual actuation.

22. A convertible vehicle in accordance with claim 11, wherein the force communicators are pull-push bars.

23. A convertible vehicle in accordance with claim 13, wherein the drive gears have a diameter of less than 50 millimeters.

24. A convertible vehicle in accordance with claim 1, wherein:
the drive, the coupling member and the transmission are provided as a modular drive apparatus, the modular drive apparatus further having a drive plate;
wherein the modular drive apparatus may be provided with either an electric drive or a hydraulic drive so as to drive the at least one drive gear.

25. A modular drive apparatus according to claim 24, wherein either the electric drive or the hydraulic drive is mounted to the base plate.

26. A convertible vehicle in accordance with claim 11, wherein:

the drive, the coupling member and the transmission are provided as a modular drive apparatus, the modular drive apparatus further having a drive plate;

wherein the modular drive apparatus may be provided with either an electric drive or a hydraulic drive.

27. A modular drive apparatus according to claim 26, wherein either the electric drive or the hydraulic drive is mounted to the base plate.

* * * * *